May 30, 1961 W. E. BENEDICT ET AL 2,986,197
SURFACE COVERING PRODUCT AND PROCESS THEREFOR
Filed Dec. 3, 1957 2 Sheets-Sheet 1

INVENTORS.
WALTER E. BENEDICT
JOSEPH F. DOBRY
WILLIAM C. WEIGLE
BY
ATTORNEY

United States Patent Office 2,986,197
Patented May 30, 1961

2,986,197
SURFACE COVERING PRODUCT AND PROCESS THEREFOR
Walter E. Benedict, Newtown, William C. Weigle, Philadelphia, and Joseph F. Dobry, Langhorne, Pa., assignors to Congoleum-Nairn Inc., Kearny, N.J., a corporation of New York
Filed Dec. 3, 1957, Ser. No. 700,517
6 Claims. (Cl. 154—25)

This invention relates to linoleum products and to methods of producing the same. The invention is directed particularly to a new type of product having an unusual, distinctly mottled appearance which, in many respects, simulates the tufted effect of a carpet.

This application is a continuation-in-part of our copending application Serial No. 543,644, filed October 31, 1955 (now abandoned), which in turn is a continuation of our application Serial No. 343,746 filed March 20, 1953 (now abandoned) and Serial No. 410,966, filed February 17, 1954 (now abandoned).

In the production of linoleum products heretofore it has been usual to produce striated or streaked compositions by calendering differently colored irregular pieces of linoleum composition together into a sheet. The pieces of linoleum composition generally vary in size from about one eighth of an inch down to nearly a powder. The pieces are fed to the calender in a rather deep mass from about 8 to 10 inches in thickness whereby they remain in contact with the calender rolls over a relatively large arc of rotation and are drawn into the nip of the rolls so as to be compacted into a dense wedge. The calender rolls themselves may be scraped with a doctor blade but they are not washed or thoroughly cleaned, and as a result, a thin somewhat tacky film of composition adheres to the rolls. The rolls therefore draw out and smear the composition of the wedge producing a unitary sheet presenting a directional decoration in the finished product. Attempts have been made to produce linoleum sheets which do not have directional decorations. As a result completely non-directional decorations have been produced by molding techniques. These procedures involve the placing of various colored granules of linoleum on a felt backing, usually by the use of stencils, and then subjecting the covered felt to a molding operation in a hydraulic press. Non-directional decorations have also been produced by the so-called geometric technique where sections are cut out of one sheet and insertions of various colors and shapes are placed in the cutouts. Both of these procedures for producing non-directional decorations are costly and slow and involve the use of extensive equipment. The molding technique has an additional disadvantage in that it produces a sheet with many surface irregularities.

The linoleum industry has been striving to produce non-directional decorations by conventional high-speed calendering with the resulting economies of operation. The first successful effort to produce a linoleum product having greatly reduced directional characteristics by single pass calendering was disclosed in U.S. Patent 2,624,068 which issued on January 6, 1953, to Joseph F. Dobry. In the process disclosed in this patent, irregular pieces of uncured linoleum composition of from about one-quarter inch to three-eighths inch in diameter are fed at a conventional depth of feed of from twelve to eighteen inches between calender rolls having clean surfaces. The next development towards non-directional decorations was the discovery that rectangular pieces of uncured linoleum of from one-half to one and one-half inches in their largest dimension could be calendered together between clean rolls to produce a sheet having the rectangular pieces visible in its surface. In this product, the pieces were distorted longitudinally, but because of the clean rolls, the distortion was limited to about a three to five times increase in length and the rectangular pieces remained visible in the surface of the sheet. This discovery is disclosed in U.S. Patent 2,694,831 which issued on November 23, 1954, to Walter E. Benedict et al. A modification of the latter process is disclosed in U.S. Patent 2,722,265 which issued on November 1, 1955, to Bernard J. Kelly et al. In the Kelly et al. patent, the rectangular pieces of linoleum are cut from a sheet formed by laminating two or more sheets together. In the process of these latter two patents, the depth of feed of the rectangular pieces is kept to a minimum in order to limit the elongation of the pieces as much as possible. The depth of feed cannot be reduced below about four to six inches without the formation of excessive weak areas or bare spots in the calendered sheet. The formation of bare spots and weaknesses is characteristic of the processes using clean rolls since the clean surface of the rolls does not grab or hold the pieces of linoleum composition and force them to the nip of the calender rolls as in the case with unclean rolls. The height of the feed of the pieces to the calender in clean rolls processes has to be carefully balanced between poor knit and excessive elongation of the pieces. This problem is particularly evident in thin sheets of linoleum of 0.090 inch thickness and under which are the conventional commercially produced sheets. As is evident, the production of a thin sheet of linoleum is more subject to the formation of bare spots and poor knit because of the relatively larger size pieces, as compared with the thickness of the sheet, which must be handled to produce the finished sheet.

One of the objects of the present invention is to produce a new type of linoleum composition having a characteristically non-directional decoration.

Another object of the invention is to provide methods wherein multi-colored rectangular pieces of linoleum composition are calendered together or into a unitary sheet wherein two or more sides of the pieces are exposed in the surface of the sheet and visible.

Another object of the invention is to provide a new type of linoleum product embodying a multitude of small, clearly defined design elements, irregularly arranged so as to eliminate or reduce directional characteristics in the design, and which extend undistorted throughout the thickness of the sheet.

Another object of the invention is to provide methods whereby such non-directional decoration can be produced with greatly minimized loss of product due to bare spots and poor knit of the composition.

A further object of the invention is to provide a method whereby relatively small pieces of linoleum composition of predetermined dimensions, each of which embodies a plurality of colors, may be calendered in such a way that the various pieces pass through the calender rolls in different positions and are capable of lateral spreading whereby the individual elements are of approximately the same size although they vary considerably in shape and appearance from those adjacent thereto.

It has been discovered that when sheets of striated, jaspé marbleized or other laminated and multicolored linoleum composition are broken up into relatively small particles in the shape of squares or rectangles of predetermined limited dimensions and are fed to a calender in limited depth having clean calender rolls, the duration of contact of the composition with the rolls is reduced and the tendency to produce a dense wedge of composition in the nip of the rolls is also reduced. Smearing and elongation of the multi-colored pieces is thereby limited and the individual pieces are afforded greater freedom of movement so that they may undergo much greater lateral spreading than is possible when larger pieces or a thick layer of composition is subjected to a calendering operation in producing a unitary sheet. Moreover, an increase in yield is obtained by eliminating to a great extent the loss of the product due to the formation of voids and areas of poor knit in the calendered sheet. This is particularly unexpected in view of the fact that any reduction in the height of the feed with larger rectangles results in increased voids and areas of poor knit.

In this way a new type of design is obtained wherein the individual design elements are visible on the surface of the sheet and are of approximately the same size in both width and length, giving a generally uniform appearance to the product as a whole although every design element is different in coloration from any other. It is for this reason that the product has a novel and pleasing appearance that is somewhat textured in character and substantially non-directional in character. In addition the design elements remain unchanged throughout the thickness of the product.

In order to attain this effect the dimensions of the square or rectangular pieces being calendered are limited in size to a predetermined range of from about 1 to 5 times and preferably 2 to 4 times the thickness of the finished calendered sheet to be produced. The dimensions of the pieces are within the range of from about 3/64 of an inch to 1/4 of an inch and have on any given side a surface area of less than 1/16 square inch. The invention is particularly advantageous when applied to the production of relatively thin sheets of linoleum of less than 0.090 inch in thickness and down as low as about 0.025 inch. The pieces are fed to the calender in a limited depth of from 3/4 to 2 inches and preferably about 1 1/4 inches deep, so that they remain in contact with the calender rolls through only a limited arc adjacent the nip of the rolls and mass compacting of the pieces into an extended dense wedge does not occur. The desired lateral spreading of the individual pieces may, therefore, take place and the striating or directional character of the design as a whole is much less pronounced than the mottled or textured effect. Further, in carrying out the process, the rolls of the calender should be clean so that cleaned surfaces are presented to the material passing between the calender rolls so as to avoid undue elongation or distortion of the individual pieces of composition during the calendering operation. In many conditions of calendering, it is only necessary to continually clean the hot roll to remove the clinging bits of composition since the cold roll does not pick up the composition and, therefore remains clean. The absence of "fines" or other pieces of composition varying greatly in size and the manner of feeding and calendering the composition insure the production of the desired and unique design effect in the finished product.

Other objects and features of the present invention will appear from the following detailed description thereof in which reference is made to the figures of the accompanying drawing.

Figure 1:
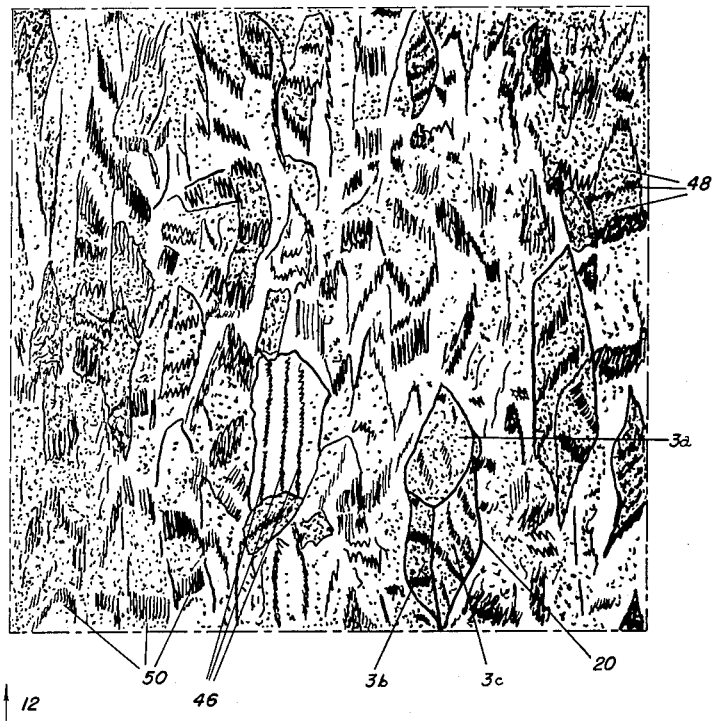
Fig. 1 is a plan view of a portion of a typical product produced in accordance with the present invention.
Figure 2:
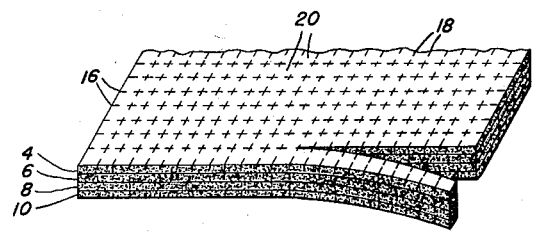
Fig. 2 illustrates a laminated sheet of material from which the pieces to be calendered may be produced.

In that form of the invention chosen for purposes of illustration in Figs. 1 to 8 of the drawing, the material is prepared for calendering by forming a slab shown in Fig. 2 of suitable thickness embodying a plurality of layers of differently colored material indicated at 4, 6, 8 and 10. In forming the slab, sheets of composition of the desired colors are placed one upon another and pressed together under sufficient pressure to cause the layers to become bonded together. Any suitable number of layers may be used and they may differ in thickness, color and shape as desired for any particular design.

After forming the slab shown in Fig. 2, it is cut into strips as indicated by the dotted lines 16 and these strips in turn are severed transversely as indicated by the dotted lines 18. In this way there are produced a large number of individual rectangular pieces each of which embodies a portion of each layer of the slab so that it has the general appearance indicated in Fig. 3.

Figure 3:
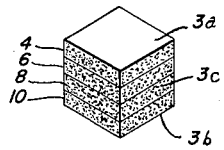
Fig. 3 is a perspective of a typical cube of linoleum composition adapted for use in practice of the present invention.
Figure 4:
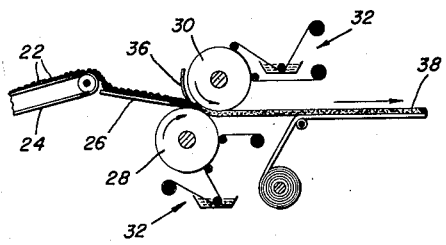
Fig. 4 is a diagrammatic illustration of typical equipment adapted for use in the practice of the present invention.

After producing the laminated rectangular pieces of Fig. 3, they are fed to a calender for formation into a unitary sheet. Any suitable type of calendering equipment may be employed but as illustrated in Fig. 4, the rectangular pieces to be calendered, indicated at 22, may be fed by a conveyor 24 to a platform 26 over which they pass to the nip of the calender rolls 28 and 30. In most instances, the lower calender roll 28 will be heated to a temperature somewhat higher than the upper calender roll 30 and the lower calender roll may be rotated slightly faster than the upper roll. The rolls of the calender preferably are continuously cleaned by applying a cleaning agent thereto and removing it from the rolls so as to carry away any adhering film of linoleum composition. The rolls, therefore, present freshly cleaned surfaces to the material being calendered, as described in the patent to Dobry No. 2,624,068. The cleaning means employed are indicated generally at 32 and are preferably of the type shown and described in United States Patent No. 2,728,103.

In order to control the feed of the rectangular pieces to the calender rolls and limit the arc of rotation during which the pieces engage the rolls, an adjustable guard or barrier member 36 is located above the upper surface of lower roll 28 and spaced therefrom a distance of, say 1 1/4 inches so as to limit the thickness of the layer of pieces actually being fed into the calender in forming the finished sheet 38. The spacing of the guard from the lower roll should be such as to prevent undue crowding of the pieces as they approach the nip of the calender. In general, the depth of the pieces actually being fed to the roll should be from about 3/4 to 2 inches which is within the range of about 10 to 30 times the thickness of the finished calendered sheet. If the depth of the pieces is less than about 10 times the thickness of the finished sheet, areas of weakness or bare spots may develop, whereas a depth in excess of about 30 times the thickness of the finished sheet tends to result in crowding and the formation of a dense wedge in the nip of the rolls with resulting elongation or smearing which adversely alters the design.

The spacing of the calender rolls 28 and 30 will of course determine the thickness of the calendered sheet 38 produced. This spacing may of course be varied as well as the force with which the rolls are urged toward each other during the calendering operation. The elevation of the guard 36 may also be varied to admit a layer of rectangular pieces of either greater or lesser thickness at any time during operation. The composition generally recovers somewhat after its compression during the calendering operation and therefore the spacing of the roll is ordinarily somewhat less than the thickness of the sheet 38. In producing a finished calendered sheet 1.4 millimeters (0.053 inch) in thickness the calender rolls are simply adjusted to produce the desired thickness of material and the rolls or guard 36 are further adjusted during operation as required to maintain the desired depth of material and thickness of the calendered sheet continuously as long as that particular gauge of material is being produced.

The rectangular pieces of material approaching the calender rolls engage the upper roll only a short distance prior to the actual compressing and deforming of the pieces by the action of the calender rolls. Few, if any, of the rectangular pieces are drawn through the calender in a way to be subjected to prolonged compression, distortion and elongation. Moreover, because of the relatively small size and cross section of the individual pieces, the limited depth of the composition being calendered, and the reduction or elimination of any compacted wedge of material in the nip of the rolls, the individual pieces are capable of transverse distortion to nearly the same degree as they are distorted in a longitudinal direction. It is for this reason that the extent of elongation is limited and the design elements may have a width approaching their length in the finished calendered product.

Figure 7:
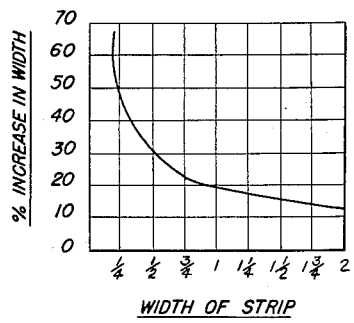
Fig. 7 is a graph indicating the variation in lateral spreading of pieces of linoleum composition upon change in size of the pieces.
Figure 8:
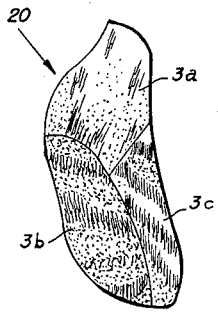
Fig. 8 is an enlarged view illustrating the appearance of the piece of Fig. 3 after being calendered in accordance with the present invention.
Figure 9:
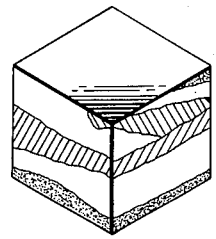
Fig. 9 is an enlarged view of another type of rectangular piece of linoleum composition employed in producing the product of Fig. 1.

The lateral spreading of the rectangular pieces of linoleum composition when subjected to a calendering operation using continuously cleaned calender rolls will vary greatly depending upon the size of the pieces. The results obtained in a typical test wherein strips of linoleum composition of uniform width were passed through a calender are shown in Fig. 7. In this test the strips were reduced in thickness from 2.40 mm. to 1.43 mm., and the increase in width of the strip then determined. This increase amounted to 66% when the strip was only 3/16 inch in width and was 50% when the strip was 1/4 inch wide, but decreases rapidly as the width is increased and is only 25% for a strip 3/4 inch in width and only 6% for a strip 6 inches in width. It is thus apparent that the lateral spreading of small rectangular pieces of linoleum composition ranging in size from less than 1/4 inch in their largest dimension greatly exceeds the spreading of larger pieces and in some instances may almost equal their elongation during the calendering operation. Moreover, as any piece spreads transversely in the relative freedom of a limited depth of material and the absence of an extended dense wedge of composition, the volume of the pieces available for extension longitudinally is so decreased that less elongation is possible.

In order to attain the characteristic design effects of the present invention, the pieces are accordingly limited in size to a predetermined range of from about 1 to 5 times the thickness of the calendered sheet to be produced. Morevore, in order to secure regularity throughout the pattern, the pieces, after being cut, may be sifted to eliminate fine and relatively coarse pieces so that all of the pieces being calendered will be nearly uniform in size.

Each of the rectangular pieces used in the practice of the present invention is characterized by the fact that it has adjacent sides of the piece possessing different design features. Thus, the face 3a of the cube in Fig. 3 is of solid color while the faces 3b and 3c are striped. When such rectangular pieces are calendered, many of the pieces are pressed or moved in a direction as indicated by the arrow 12 in Fig. 3. As a result, at least two sides of each such piece are presented in the face of the finished product in a manner to expose areas having different design features. The piece of Fig. 3 when so displaced and calendered will produce an assembly of design elements of the type illustrated in Fig. 8 and as enclosed within the outside 20 of Fig. 1. In such an assembly, the design element 3a is derived from the side 3a of the piece of Fig. 3 whereas the design elements 3b and 3c are developed from the striped side faces 3b and 3c of the piece of Fig. 3. Even though the assembly of elements indicated at 20 is itself somewhat elongated during the calendering operation, the individual design elements of the assembly are so arranged and disposed as to destroy any appearance of elongation. Accordingly, aggregations of such assemblies of design elements combine to produce an over-all design substantially devoid of any directional characteristics. The pattern as a whole is composed of a multitude of small, sharply defined, variously arranged design elements. The pattern has a textured or mottled effect which is distinctly novel and altogether foreign to that of any previously calendered linoleum products.

Figure 5:
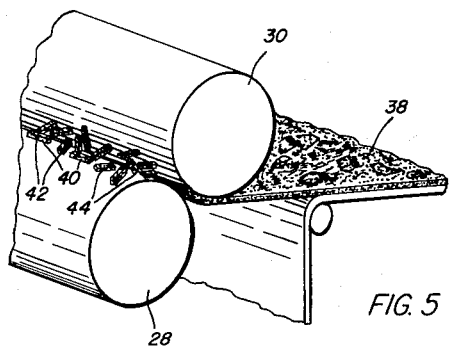
Fig. 5 is an enlarged view of a portion of the equipment illustrated in Fig. 4.
Figure 6:
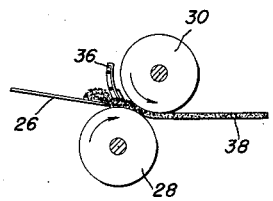
Fig. 6 is an enlarged view illustrating the manner in which the pieces are fed to the calender in the practice of the present invention.

As shown in Fig. 5, the rectangular pieces of linoleum composition pass to the calender rolls in an irregular manner so that some of the pieces, such as those indicated at 40, will pass between the rolls in a sideways direction while other pieces, such as those indicated at 42, will pass between the calender rolls in an endwise direction. Still other pieces of material such as those indicated at 44 will pass through the calender while positioned diagonally. In each of these cases, the pieces are presented to the calender rolls so as to be crushed edgewise of the laminations. Therefore, all or substantially all of the rectangular pieces are crushed edgewise in being bonded together into an integral sheet. The pieces 40 which pass through the calender sideways produce a series of parallel longitudinally extending streaks in the finished sheet as indicated at 46 in Fig. 1, whereas the pieces 42 that pass through the calender endwise produce a series of differently colored patches extending transversely of the sheet as shown at 48 in Fig. 1. The pieces 44 which are diagonal to the calender produce other irregular effects as indicated at 50.

While the rectangular pieces of the composition when calendered may be considerably elongated as indicated by the outlines of pieces as indicated at 20 in Fig. 1, the appearance of such elongation is destroyed by the multiple arrangements of the design elements within the area of the calendered piece. Such multiple arrangements result from the exposure of two or more sides of each rectangular piece within the surface of the sheet. The design as a whole is therefore generally formed of units embodying two or three assemblies of design elements variously arranged within the unit. The overall pattern of the resulting product embodies a multitude of interruptions in the design which overcome and destroy the directional characteristics and give to the design as a whole an unusual, pleasing mottled or textured appearance by reason of the variously arranged, but clearly defined individual design elements. The pattern in particular contrasts with the designs obtainable by previous calendering operations. It is especially remarkable that such a design can be produced by a single calendering operation wherein the pieces of linoleum composition are subjected to but one pass through the rolls of a calender. The characteristic pattern effect is rendered possible by the use of the limited dimension multi-colored rectangular pieces as distinguished from the larger pieces which have heretofore been calendered in the methods of the prior art.

While the product of Fig. 1 is obtained by laminating sheets of linoleum composition so as to form pieces wherein the differently colored layers are clearly defined and extend parallel to opposite faces of the rectangular pieces to be calendered; further and even more varied and pleasing patterns can be produced by arranging the differently colored layer of linoleum composition in a varied and irregular manner within the pieces to be calendered.

Figure 10:
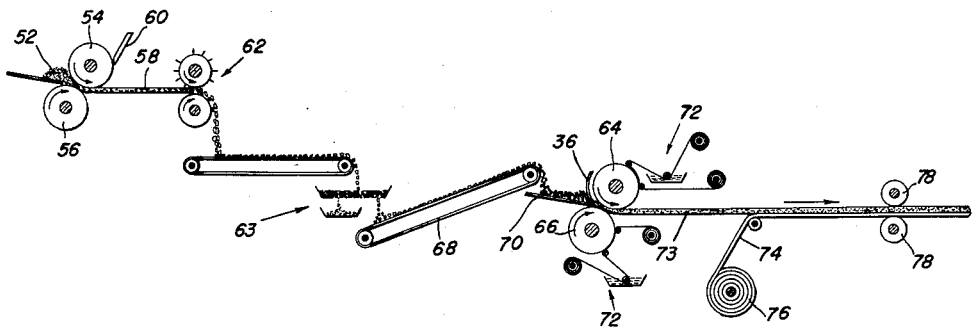
Fig. 10 is a diagrammatic illustration of typical equipment which may be used in producing the product of Fig. 1 using the rectangular pieces of Fig. 9.

In accordance with the alternate method, a conventional jaspe, striated or marbleized sheet is first produced by any conventional or preferred method. Thus, for example, in using the equipment illustrated in Fig. 10, differently colored pieces of linoleum composition indicated at 52 are fed to the calender rolls 54 and 56 in a conventional manner to produce a striated sheet 58. The roll 54 may be maintained at a higher temperature than the roll 56 and the depth of the composition fed to the rolls may be 6 or 8 inches. The rolls preferably are not specially cleaned although each may be provided with a doctor blade 60 to prevent any undesired build up of composition on the rolls.

The striated or jaspe sheet 58 produced then is passed to a suitable chopper 62 which serves to reduce the sheet 58 to small rectangular pieces with clean-cut edges wherein the largest dimension is less than ¼ inch and any given side is less than 1/16 square inch in area and the shorter dimension is preferably not below about 3/64 inch. It is preferable to have all the pieces substantially the same size. Particularly desirable results are obtained with pieces having the dimensions 3/32 x 3/16 x 3/16. A finer textured product can be obtained by using pieces having the dimensions 3/16 x 3/32 x 3/64 inch. From the chopper 62 pieces pass to sifting means 63 which eliminate the very fine and very coarse material leaving a product wherein substantially all of the rectangular pieces are of the desired range in size.

The sifted pieces are fed to the calender rolls 64 and 66 by means of a conveyor or other suitable means 68. In the preferred form of the invention, the conveyor 68 discharges the pieces onto an inclined chute 70 which directs them onto the upper surface of the lower calender roll whereby they are advanced with the roll toward the nip of the calender.

The rolls of the calender may be heated to the desired temperatures and ordinarily the upper roll 64 is maintained at a lower temperature of around 50° F. than the lower roll 66, which is maintained at about 170° F. whereby elongation and undesired distortion of the pieces exposed in the upper surface of the sheet is reduced to a minimum.

Distortion of the calendered multi-colored pieces may also be limited by continuously cleaning the rolls 64 and 66 by suitable means, for example, as described in the patent to Dobry No. 2,624,068. The mechanism employed for this purpose is indicated generally at 72 and may be of the type shown in United States Patent No. 2,728,103.

When the sheet 73 formed by the calendering operation issues from between the calender rolls, it preferably is applied to a layer of backing material 74, such as felt, burlap or the like. Such a backing may be supplied from a roll 76 and for this purpose travels upward and beneath the calendered sheet 73 so as to support the same. The assembly of the backing and calendered sheet is then passed to a pressing device such as the roll press 78 which serves to bond the decorative sheet of linoleum composition to the layer of backing material. The assembly may be cured or finished in any preferred or conventional manner.

The manner in which the pieces themselves are produced may be varied and numerous types of striated, jaspe or marbleized material may be used. If desired, solid color pieces may be used in combination with multi-color pieces or by themselves.

The type of equipment used in producing products of the present invention may of course be varied and the finished product may be employed in producing straight-line inlaid and other types of linoleum products as well as products of uniform of overall design.

Any departure from the foregoing specification that conforms to the invention is intended to be included within the scope of the claims.

What is claimed is:
1. In a method of producing a calendered linoleum sheet in a continuous operation wherein a layer of multi-colored, flat rectangular pieces of uncured linoleum composition having a thickness ranging from about 1 to 5 times the thickness of the calendered sheet to be produced are fed to the nip between two calender rolls having clean surfaces and bonded into a smooth, unitary sheet therebetween, the improvement which comprises limiting the size of said pieces to uniform pieces having on any given side a surface area of less than 1/16 square inch and a greatest lineal dimension or less than ¼ inch, and regulating the depth of said layer fed to said calender rolls to ¾ to 2 inches and within the range of 10 to 30 times the thickness of the finished calendered sheet.

2. The method of claim 1 wherein the multi-colored, flat rectangular pieces are produced by severing from a striated sheet of uncured linoleum composition.

3. The method of claim 1 wherein the multi-colored, flat rectangular pieces are produced by severing from a sheet formed by laminating together at least two differently colored, thin sheets of linoleum composition.

4. In a method of producing a calendered linoleum sheet in a continous operation wherein a layer of multi-colored, flat rectangular pieces of uncured linoleum composition having a thickness ranging from about 2 to about 4 times the thickness of the calendered sheet to be produced are fed to the nip between two calender rolls having clean surfaces and bonded into a smooth, unitary sheet therebetween, the improvement which comprises limiting said pieces to uniform pieces having on any given side a surface of less than 1/16 square inch and a greatest lineal dimension between 1/16 and ¼ inch, and regulating the depth of said layer fed to said calender rolls to ¾ to 2 inches and within the range of 10 to 30 times the thickness of the calendered sheet.

5. In a method of producing a calendered linoleum sheet in a continous operation wherein a layer of multi-colored, flat rectangular pieces of uncured linoleum composition having a thickness ranging from about 2 to 4 times the thickness of the calendered sheet to be produced are fed to the nip between two calender rolls having clean surfaces and bonded into a smooth, unitary sheet therebetween, the improvement which comprises limiting said pieces to uniform pieces having on any given side a surface of less than 1/16 square inch and lineal dimensions between 3/64 and ¼ inch, and regulating the depth of said layer fed to said calender rolls to ¾ to 2 inches and within the range of 10 to 30 times the thickness of the calendered sheet.

6. In a method of producing a calendered linoleum sheet having a thickness less than 0.09 inch in a continuous operation wherein a layer of multi-colored, flat rectangular pieces of uncured linoleum composition having a thickness ranging from about 1 to 5 times the thickness of the calendered sheet to be produced are fed to the nip between two calender rolls having clean surfaces and bonded into a smooth, unitary sheet therebetween, the improvement which comprises limiting the size of said pieces to uniform pieces having on any given side a surface area of less than 1/16 square inch and a greatest lineal dimension of less than ¼ inch and regulating the depth of said layer fed to said calender rolls to ¾ to 2 inches and within the range of 10 to 30 times the thickness of the finished calendered sheet.

References Cited in the file of this patent

UNITED STATES PATENTS

| | | |
|---|---|---|
| 2,624,068 | Dobry | Jan. 6, 1953 |
| 2,694,831 | Benedict et al. | Nov. 23, 1954 |
| 2,722,265 | Kelley et al. | Nov. 1, 1955 |
| 2,740,991 | Hess et al. | Apr. 10, 1956 |

FOREIGN PATENTS

| | | |
|---|---|---|
| 649,043 | Great Britain | Jan. 17, 1951 |